(12) United States Patent
Chapman et al.

(10) Patent No.: US 6,822,702 B2
(45) Date of Patent: Nov. 23, 2004

(54) PIXELLATED DEVICES SUCH AS ACTIVE MATRIX LIQUID CRYSTAL DISPLAYS

(75) Inventors: Jeffrey A. Chapman, Burgess Hill (GB); Pieter J. Van Der Zaag, Pyrford (GB); Steven C. Deane, Red Hill (GB); Ian D. French, Hove (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 309 days.

(21) Appl. No.: 09/998,032

(22) Filed: Nov. 29, 2001

(65) Prior Publication Data

US 2002/0109798 A1 Aug. 15, 2002

(30) Foreign Application Priority Data

Dec. 2, 2000 (GB) .............................. 0029427

(51) Int. Cl.⁷ .................. G02F 1/136; H01L 21/00; H01L 29/15; H01L 29/80
(52) U.S. Cl. .............. 349/43; 349/46; 438/30; 257/72; 257/259
(58) Field of Search ............ 349/43, 46; 438/30; 257/72, 259

(56) References Cited

U.S. PATENT DOCUMENTS

| | | | | |
|---|---|---|---|---|
| 4,846,557 A | * | 7/1989 | Leroux et al. | 349/143 |
| 5,475,396 A | * | 12/1995 | Kitajima et al. | 345/92 |
| 5,929,489 A | * | 7/1999 | Deane | 257/347 |
| 6,198,051 B1 | * | 3/2001 | Moshrefzadeh et al. | 174/255 |
| 6,288,764 B1 | * | 9/2001 | Zhang et al. | 349/152 |
| 6,498,087 B2 | * | 12/2002 | French et al. | 438/609 |
| 6,567,146 B2 | * | 5/2003 | Hirakata et al. | 349/139 |
| 6,577,272 B1 | * | 6/2003 | Madden | 342/387 |
| 2001/0019374 A1 | | 9/2001 | Izumi et al. | 349/43 |

FOREIGN PATENT DOCUMENTS

| EP | 0518422 | 12/1992 | ........... C03C/17/10 |
|---|---|---|---|
| WO | WO 99/59024 | * 11/1999 | |

OTHER PUBLICATIONS

"Conductivity Enhancement of Transparent Electrode by Side–Wall Copper Electroplating", J. Liu et al, SID 93 Digest, pp. 554–557.

* cited by examiner

*Primary Examiner*—Long Pham
*Assistant Examiner*—Shrinivas H. Rao (57) ABSTRACT

A method of forming an active plate for a liquid crystal display is disclosed in which the source and drain conductors (28, 30), pixel electrodes (38) and column conductors (32) are formed by depositing and patterning a transparent conductor layer. There is selective plating of areas (52; 60) of the transparent conductor layer to form a metallic layer for reducing the resistivity of the transparent conductor layer. The plated areas include the column conductors (32) but exclude the source and drain conductors and the pixel electrodes. This enables the column conductors to be treated to reduce the resistivity, but without altering the channel length of the transistor because the source and drain parts of the layer are shielded from the plating process.

23 Claims, 5 Drawing Sheets

PIXELLATED DEVICES SUCH AS ACTIVE MATRIX LIQUID CRYSTAL DISPLAYS

This invention relates to pixellated devices such as active matrix liquid crystal displays, and particularly to the transistor substrate, known as the active plate, used in the manufacture of such devices.

A liquid crystal display typically comprises an active plate and a passive plate between which liquid crystal material is sandwiched. The active plate comprises an array of transistor switching devices, typically with one transistor associated with each pixel of the display. Each pixel is also associated with a pixel electrode on the active plate to which a signal is applied for controlling the brightness of the individual pixel.

Figure 1:
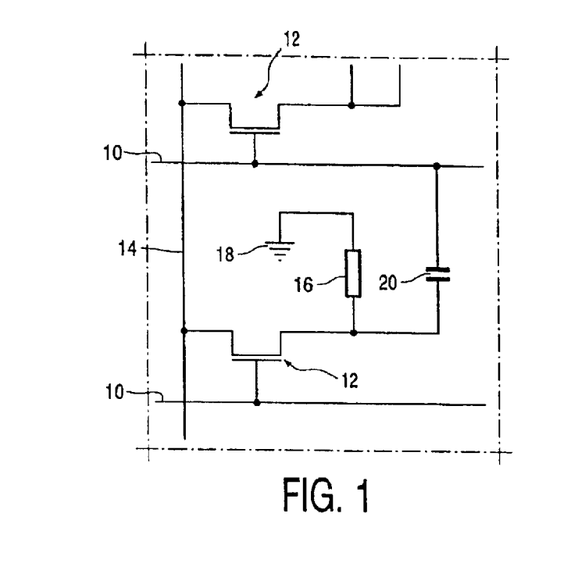
FIG. 1 shows the pixel components of an active plate.

FIG. 1 shows the electrical components which make up the pixels of one known example of active plate of an LCD. The pixels are arranged in rows and columns. The row conductor 10 of a pixel is connected to the gate of the TFT 12, and the column electrode 14 is coupled to the source. The liquid crystal material provided over the pixel effectively defines a liquid crystal cell 16 which extends between the drain of the transistor 12 and a common ground plane 18. An optional pixel storage capacitor 20 is connected between the drain of the transistor 12 and the row conductor 10 associated with an adjacent row of pixels.

For transmissive displays, a large area of the active plate is at least partially transparent, and this is required because this type of display is illuminated by a back light. In these display devices, the pixel electrode must be transparent, whereas row and column conductors are formed as metallic lines which are opaque. Metallic layers, such as chromium, aluminium, alloys or multilayer structures are used for the row and column conductors because of the high conductivity, which improves the device performance. The conductivity of the lines (usually the column lines) to which the pixel drive signals are applied is particularly important in large displays, because a sizeable voltage drop occurs over the length of the line, making it impossible to drive uniformly all pixels along the line (column).

A problem with the use of metallic column conductors is that separate deposition and lithographic procedures are required to form the column conductors and the pixel electrodes. The pixel electrodes must be transparent, and are typically formed from a transparent conductive oxide film. It is well known that the lithography steps in the manufacturing process are a major contributing factor to the expense of the manufacturing process. Each lithographic step can be considered to reduce the yield of the process, as well as increasing the cost.

Figure 2:
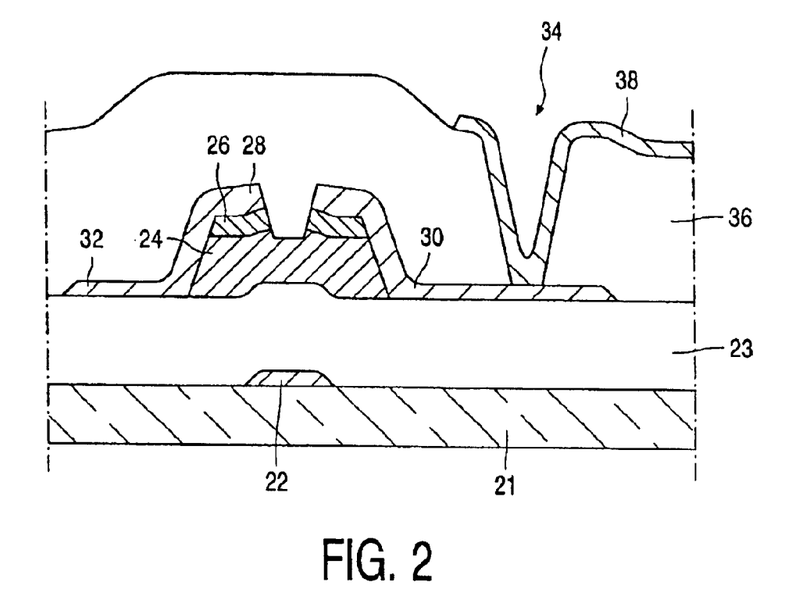
FIG. 2 shows a conventional active plate using bottom gate TFTs and manufactured using a five mask process.

The conventional manufacturing process for the active plate of an LCD is a five mask process. With reference to the bottom gate TFT LCD active plate shown in FIG. 2, the process steps, each requiring a separate mask definition, are:

(i) defining the gate 22 (which is part of the row conductor) over the substrate 21;
(ii) defining the amorphous silicon island (which overlies a gate dielectric 23 which covers the entire structure), comprising a lower intrinsic layer 24 and an upper doped contact layer 26;
(iii) defining the metallic source 28, drain 30 and column electrode 32;
(iv) defining a contact hole 34 in a passivation layer 36 which covers the entire substrate; and
(v) defining the transparent pixel electrode 38 which contacts the drain 10 through the hole 34.

The capacitor shown in FIG. 1 may simply be formed from the gate dielectric by providing an area of overlap of one pixel electrode with a portion of the row/gate conductor of the adjacent row.

There have been various proposals to reduce the number of lithography steps, and thereby the mask count, of the manufacture process in order to reduce cost and increase yield.

Figure 3:
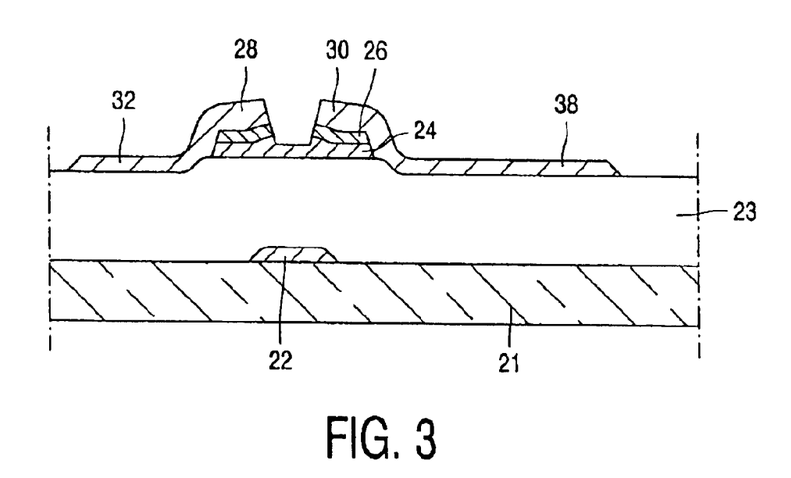
FIG. 3 shows a proposed active plate using bottom gate TFTs and manufactured using a two mask process.

For example, it has been proposed to form the column conductors from the same transparent conductive oxide film as the pixel electrode, so that these components of the pixel structure can be deposited and patterned together. Additional measures can result in a two mask process, and this is explained with reference to the bottom gate TFT LCD active plate shown in FIG. 3. The process steps, each requiring a separate mask definition, are:

(i) defining the gate 22 (and row conductors); and
(ii) defining the transparent column electrode 32 (which also forms the TFT source 28) and the pixel electrode 38 (which also forms the TFT drain 30).

The definition of the semiconductor island 24, 26 can be achieved by a self-aligned process using the gate 22, for example by using UV exposure through the substrate. Of course, the semiconductor could equally be formed with a third mask step (between steps (i) and (ii) above). In the periphery of the array, the gate dielectric 23 is etched away using a low-precision stage, to allow contact to the gate lines at the periphery of the display.

In this structure, the high resistivity of the transparent conductive oxide film used for the column lines prevents the use of the structure in large (TV-sized) displays.

For this reason, there are further proposals to treat the column conductor area of the layer to increase the conductivity, whilst not affecting the transparency of the pixel electrode. For example, the article "Conductivity Enhancement of Transparent Electrode by Side-Wall Copper Electroplating", J. Liu et al, SID 93 Digest, page 554 discloses a method of enhancing the conductivity by electroplating a copper bus to the side of the metal oxide column line. The process involves an incomplete etching process to leave metal oxide residues, which act as seeds for the copper growth. The process is complicated and difficult to control. In addition, the copper bus will surround the source and drain electrodes, and there is a risk of shorts between the source and drain resulting from fast lateral copper growth when forming the bus. The copper bus around the source and drain electrodes also influences the channel length of the TFT and therefore makes the TFT characteristics less predictable.

WO 99/59024 discloses a method for enhancing the conductivity of a transparent electrode by providing patterned metallic layers adjacent to the transparent electrodes.

There is still a need for a simple process for increasing the conductivity of a transparent metal oxide layer, such as ITO, without increasing dramatically the complexity of the process, for application in active matrix LCD manufacture.

According to a first aspect of the invention, there is provided a method of forming a pixellated device, comprising:

defining pixel areas, each pixel area comprising:
a thin film transistor having a gate conductor and source and drain conductors separated by a gate insulator and a semiconductor channel;
a pixel electrode; and
a line conductor associated with the source or drain conductor,
wherein the source and drain conductors, pixel electrodes and line conductors are formed by depositing and patterning a transparent conductor layer and by selectively electroplating areas of the transparent conductor layer to form a metallic layer for reducing the resistivity of the transparent conductor layer, the areas including the line conductors and excluding the source and drain conductors.

Preferably, the electroplated areas comprise edge regions of the line conductors, and may exclude the pixel electrodes.

According to a second aspect of the invention, there is provided a method of forming a pixellated device, comprising:

defining pixel areas, each pixel area comprising:
a thin film transistor having a gate conductor and source and drain conductors separated by a gate insulator and a semiconductor channel;
a pixel electrode; and
a line conductor associated with the source or drain conductor,
wherein the source and drain conductors, pixel electrodes and line conductors are formed by depositing and patterning a transparent conductor layer and by selectively plating upper surface areas of the transparent conductor layer using an electroless plating step to form a metallic layer for reducing the resistivity of the transparent conductor layer, the areas including the line conductors and excluding the source and drain conductors.

The methods of the invention enable the column conductors (the line conductors) to be treated to reduce the resistivity, but without altering the channel length of the transistor because the source and drain parts of the layer are shielded from the plating process. The areas may be at the edge of the transparent conductor layer (and deposited by electroplating) or over the top (and deposited by electroless plating).

The methods of the invention can be used in display devices having top or bottom gate transistors. For bottom gate transistors, the method comprises:

depositing and patterning a gate conductor layer over an insulating substrate;
depositing a gate insulator layer over the patterned gate conductor layer;
depositing a silicon layer over the gate insulator layer; and
depositing and patterning the transparent conductor layer.
In one example, the selective plating comprises:
printing a shielding layer for shielding the source and drain conductors; and
plating the non-shielded areas of the transparent conductor layer to form a metallic layer for reducing the resistivity of the non-shielded areas.
In another example, the selective plating comprises:
plating the transparent conductor layer to form a metallic layer for reducing the resistivity;
printing a shielding layer and removing the metallic layer of the unshielded area.

In this method, the resist layer remains over the column lines which reduces the risk of shorts between columns.

The transparent conductor layer preferably comprises a conductive oxide, for example ITO, which may be deposited by printing.

The active plate may be formed by a two mask process. In this case, the gate conductor is deposited and patterned with a first lithographic process and the transparent conductor layer defining source and drain conductors and pixel electrodes is deposited and patterned with a second lithographic process, the silicon layer being self aligned to the gate conductor.

The method of the invention are preferably for forming the active plate of an active matrix liquid crystal display.

The invention also provides a pixellated device, comprising:

pixel areas, each pixel area comprising:
a thin film transistor having a gate conductor and source and drain conductors separated by a gate insulator and a semiconductor channel;
a pixel electrode; and
a column conductor associated with the source or drain conductor,
wherein the source and drain conductors, the column conductors and the pixel electrodes are defined by a transparent conductor layer having a metallic layer in contact with a portion of the transparent conductor layer, the portion including the column conductors and excluding the source and drain conductors.

By avoiding deposition of the metallic layer in the region of the source and drain, it is possible to prevent the plating of the metallic layer influencing the transistor characteristics, which may otherwise arise for example as a result of variation of the channel length.

The device preferably comprises the active plate of an active matrix liquid crystal display. The invention also provides an active matrix liquid crystal display comprising this active plate, a passive plate, and a layer of liquid crystal material sandwiched between the active and passive plates.

Examples of the invention will now be described in detail with reference to the accompanying drawings, in which.

It should be noted that the figures are diagrammatic and not drawn to scale. Relative dimensions and proportions of parts of these figures have been shown exaggerated or reduced in size, for the sake of clarity and convenience in the drawings.

FIG. 4 shows a first method forming an active plate according to the invention. FIG. 4A shows a gate conductor layer 40 deposited over an insulating substrate and patterned to define a transistor gate 42 and an associated row conductor 44. As will be apparent from the following description, the gate conductor layer 40 comprises an opaque material, for example chromium, aluminium or molybdenum or combinations of these. Patterning to achieve the layout shown in FIG. 4A is then achieved using a wet or dry etching technique. A gate insulator layer is provided over the entire substrate overlying the gate conductor layer 40. This gate insulator layer may be a single layer of, for example, silicon nitride or else it may comprise a multiple-layer structure.

A semiconductor layer, for example hydrogenated amorphous silicon, is deposited over the gate insulator layer overlying the entire substrate. A doped n⁺ silicon contact layer is also deposited over the amorphous silicon layer. This completes the structure shown in FIG. 4A, although the gate insulator layer and the silicon layer are not shown. The patterning of the silicon layer or layers may be achieved by etching using either a separate photolithographic process, or the semiconductor island may be self aligned with the gate 42, thereby avoiding the need for an additional mask step.

Figure 4A:
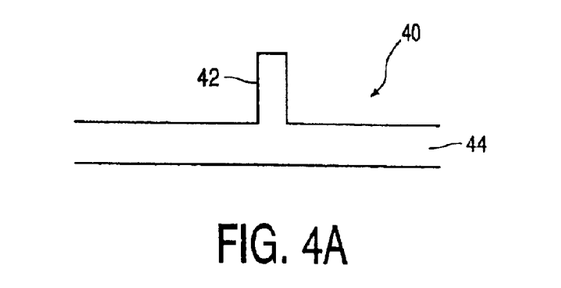
FIG. 4 shows a first manufacturing process of the invention.
Figure 4B:
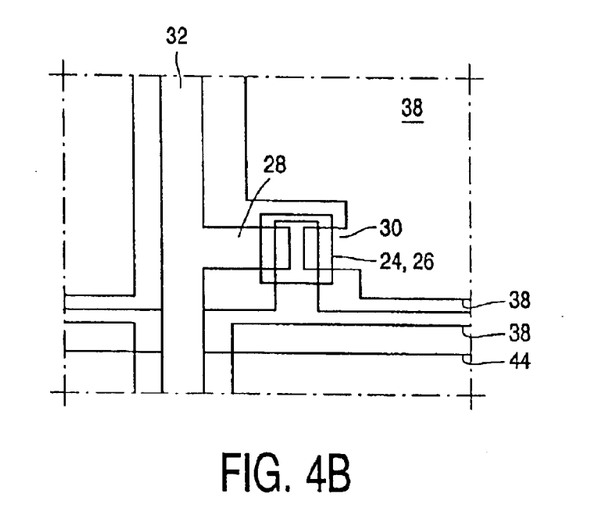

A source and drain conductor layer which also defines the pixel electrode is deposited and patterned over the silicon layer to provide the structure shown in FIG. 4B. This source and drain conductor layer defines the transistor source 28 coupled to an associated column conductor 32, the transistor drain 30 and the pixel electrode 38. The semiconductor island is shown as 24, 26. The overlap of the pixel electrode 38 over the row conductor 44 defines, with the gate dielectric, the storage capacitor 20 of FIG. 1. The material of this source, drain and pixel electrode layer is transparent, and comprises a metal oxide or mixed metal oxide, most preferably indium tin oxide.

In accordance with the invention, areas of the transparent conductor layer are selectively plated to form a metallic layer for reducing the resistivity of the transparent conductor layer. These areas include the column conductors 32 but exclude the source and drain conductors 28,30 and the pixel electrodes 38. Before the selective plating, the transparent conductor layer is pre-treated, for example using a reductive process in acid or neutral indifferent electrolyte.

Figure 4C:
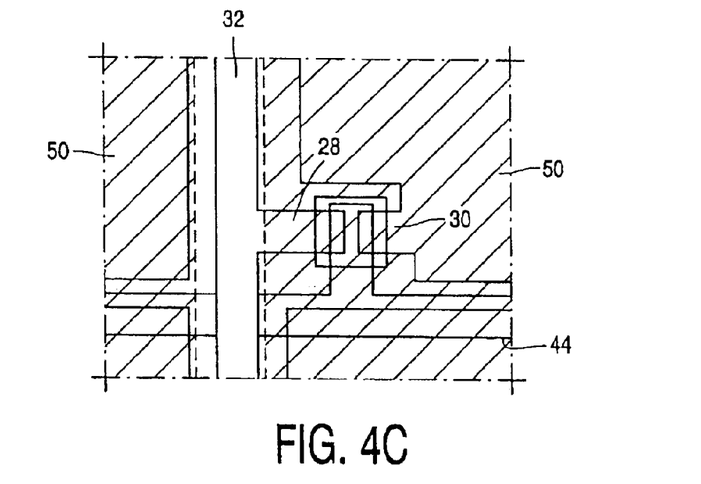
Figure 4D:
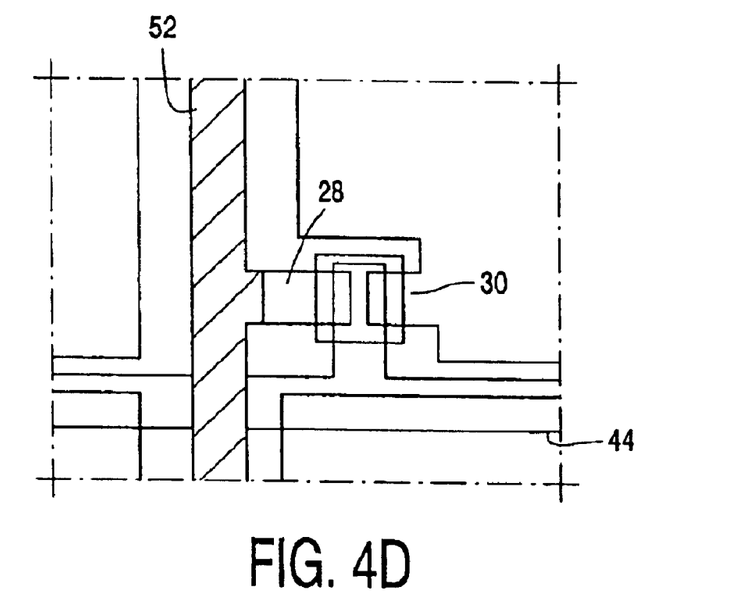

In the example of FIG. 4, the selective plating is achieved by printing a shielding layer 50 so that the pixel electrode 38, the source and drain 28,30 are covered, and the columns 32 are exposed, as shown in FIG. 4C. In a subsequent plating step, the columns are plated with conductive material, which covers the top part of the ITO columns. Thus, the hatched area 52 in FIG. 4D is plated to reduce the resistivity, and then the remaining shielding layer is removed.

The shielding layer may comprise an organic polymeric resist material. Resist layers can be printed with sufficient accuracy and have the required shielding properties (i.e. selective etchants are readily available). Of course, many polymers may be used, for example polyimide, UV-cured photoresist or acrylic acid resins.

The printing process used may be a gravure offset printing technique, which will be well known to those skilled in the art.

An alternative method for achieving the selective plating is explained with reference to FIG. 5. The steps explained with reference to FIGS. 4A and 4B are repeated. As shown FIG. 5, the next step involves plating with copper all exposed conductor surfaces. Subsequently, the shielding layer 60 is printed on the column areas. The resist is used to selectively etch the copper off the other areas but leave the copper layer over the column conductors. The structure shown in FIG. 4D results, but the resist layer remains over the column lines, which reduces the risk of shorts between columns.

There are two possible techniques for the plating operation, namely electroplating and electroless plating.

If electroplating is employed, it is preferred that a technique as described in the article "Conductivity Enhancement of Transparent Electrode by Side-Wall Copper Electroplating", J. Liu et al, SID 93 Digest, page 554 is used. Before the electroplating process, a mild reductive pretreatment is carried out. After the selective electroplating procedure, an edge bus remains adjacent the non-shielded part of the transparent conductor. No edge bus remains adjacent the source and drain electrodes, so the channel length of the transistor is unaltered.

Electroplating is not preferred when a metallic layer is to be formed over the top of the ITO. This is because it is difficult to obtain uniform surface treatment in the pretreatment stage. As a result, the thickness of the electroplated layer can vary significantly over different areas of the transparent layer. The larger area of the top surface of transparent layer results in a reduced current density, requiring a longer electroplating process. Variations in the layer thickness alter the LCD cell gap, so that control of this gap becomes more difficult.

It is, however, desirable to metallise the top surface of the transparent layer. This can simplify the required black mask layer, as it can render all of the area of the column lines opaque. This also enables a greater reduction in the resistivity. Electroless plating is employed to enable surface coating.

There are at least two alternative electroless plating techniques for plating copper onto ITO.

In one process (known as the Meltex process) the ITO is first etched mildly to optimise the adhesion strength. Then, the surface is reduced chemically using, for example, $NaBH_4$ (an alternative is $KBH_4$). The metallic indium formed is exchanged for palladium in an acidic Pd(II) bath. The Pd nuclei enable electroless metal deposition. Excellent selectivity and good adhesion of electroless Ag can be obtained. The whole procedure consists of batch processes. There are, however, a few aspects to this procedure which make it less attractive for large-size LCD production:

1) First, it relies on the use of $NaBH_4$ (or similar hydride materials), as other more stable strong reducing agents known (hypophosphite) are not able to reduce ITO. $NaBH_4$ (and similar hydride materials) is very unstable, and very toxic.
2) The procedure consists of four steps (+four rinses), and necessitates proper waste treatment.

This provides one possible electroless plating process, but an alternative so-called Pd-sol process is preferred. The Pd-sol process is based on selective adsorption of polyvinylalcohol (PVA)- or polyvinylpyrrolidone (PVP)-stabilised Pd particles on ITO. The selectivity depends on the plating chemistry used.

The following steps are involved: First the pixel electrode has to be protected from being plated by application of a resist. Then, a cleaning step is necessary to get adequate selectivity and adhesion. This can be done by UV/ozone or oxygen plasma. After cleaning, the ITO has to be activated, because electroless metallization needs a catalytic surface for the reaction to start. Activation is done by adsorption of a suitable metallic nanoparticle. The next step is thus immersion in a suitably prepared Pd-sol such that selective adsorption on ITO and not on the glass occurs. A typical treatment time is 2–4 minutes. After rinsing with water, the sample is immersed in the electroless plating solution. Typical metals that can be used are Cu, Ni, Ag and Au, and Cu or Ag are preferred for this application. Alternatives to the Pd-sol are Pt-, Ag-, AgPd- or AgPt-sols.

Since metal is plated on the top of the ITO column electrode a low thickness, for example below 0.2 $\mu$m, will suffice for the required column resistivity.

More details of this electroless plating technique, and in particular the Pd sol preparation, are described in EP 0 518 422, which is incorporated herein by way of reference material.

In a modified version of this method, the necessary activation of the transparent conductor layer for electroless plating is carried out at an earlier stage in the processing. Immediately after the deposition of the transparent conductor layer and before the shielding layer 50 is provided the transparent conductor layer is activated by depositing thereon a very thin film, around just a few nanometres in thickness, of activating material such as palladium or platinum. If the transparent conductor layer, for example of ITO, is sputter deposited, then the activating material can similarly be sputter deposited.

Figure 5:
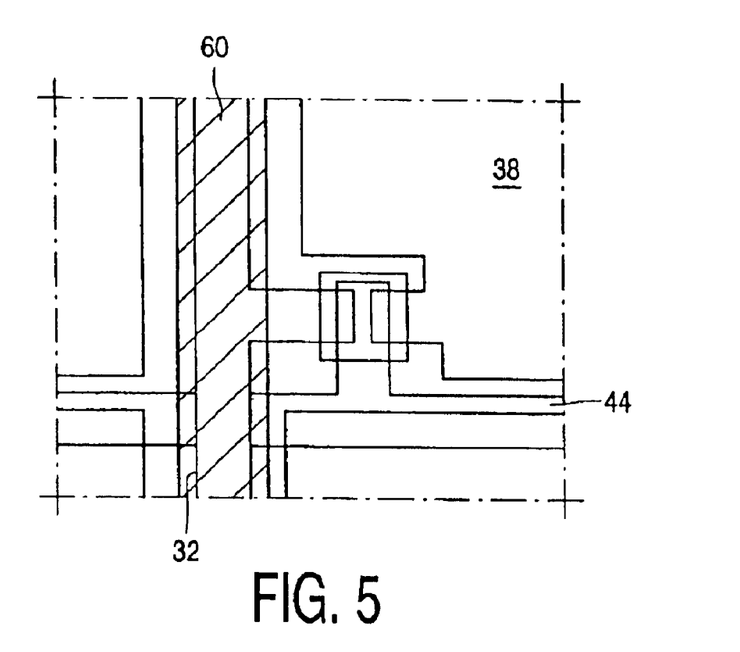
FIG. 5 shows a second manufacturing process of the invention.

The transparent conductor layer is then electrolessly plated as before, either at the exposed regions after providing the shielding layer 50 (FIG. 4) or completely with selected areas of the plating subsequently removed using the shielding layer 60 (FIG. 5). Besides reducing the number of processing steps required, for example, by eliminating an intermediary step of cleaning the ITO layer prior to activating, this modified approach can provide extra robustness to the process. A further advantage is that the adhesion of a sputtered Pd or Pt activation film is likely to be superior than that of a wet chemically deposited film.

Figure 6:
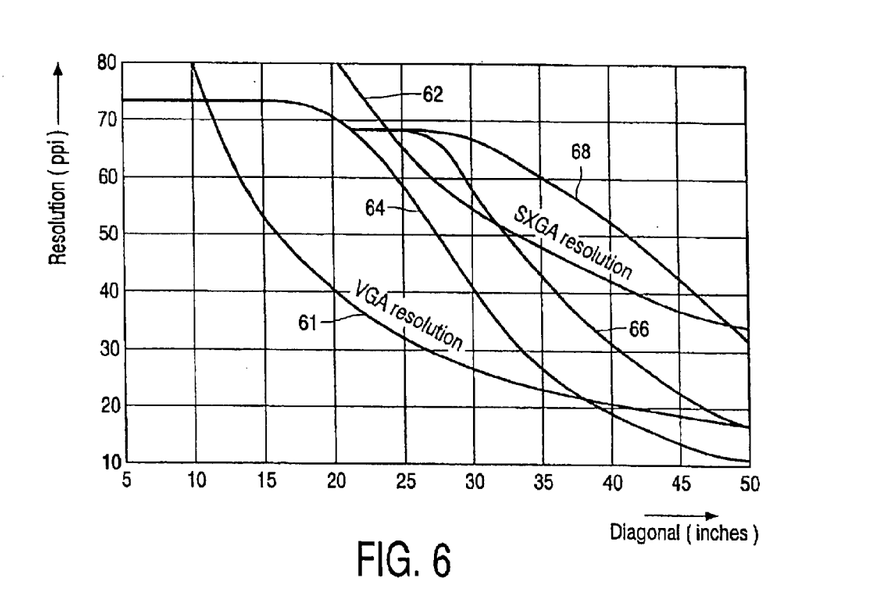
FIG. 6 is used to explain display performance as a function of column resistance.

FIG. 6 shows the display size that can be implemented for different column resistivity levels and for different display qualities. The x-axis plots the diagonal size of the display, and the y-axis plots the resolution. Plot 61 shows the relationship between diagonal size and resolution to provide VGA quality, and plot 62 shows the relationship between diagonal size and resolution to provide SXGA quality.

Plot 64 shows that with columns with a resistivity of 40 $\mu\Omega$cm, LCD-TV application should be possible up to a 39" diagonal. Whereas with $\rho$=20 $\mu\Omega$cm (plot 66), HD-TV (High Definition TV) applications come within range. With $\rho$=6 $\mu\Omega$cm (plot 68), then HD-TV performance with an AMLCD should be no problem (as far as the active matrix is concerned) for any normal TV diagonal. Straightforward equivalent circuit calculations allow one to translate these resistivities into the required electroless Cu layer thickness: for example 40 $\mu\Omega$cm may require 12.5 nm, 20 $\mu\Omega$cm require 30 nm, and 6 $\mu\Omega$cm require 150 nm. These are provided as one example only. Of course, thickness of the required copper (or other metal) layer will be a function of the width of the column lines as well as many other parameters of the pixel configuration.

Thus, for electroless deposited layers 30–50 nm thick, quite acceptable LCD-TV specifications can be realised, with HD-TV resolution within reach. In addition, such a thickness can be plated in approx. 3–5 minutes, depending on the metal of choice (Cu grows faster than Ag or Au) and the plating conditions. Adhesion problems due to delamination are not expected since these occur if layer thicknesses in excess of 0.2 $\mu$m are required.

The invention may enable printed ITO to be used as the transparent conductor layer. This has poorer electrical properties than ITO deposited by conventional techniques such as by sputtering. However, the subsequent copper plating improves the electrical properties of the column lines, and the poorer electrical properties can be tolerated in the small area of the pixel electrodes and source and drain regions.

The invention can be applied to devices having different forms of TFT structures, for example using amorphous silicon TFTs formed by a two-mask process with self alignment using back exposure to define the channel region. A typical pixel in a device using such is shown schematically in plan view in FIG. 7, in which components similar to those in the previous embodiments are identified by the same reference numerals.

Figure 7:
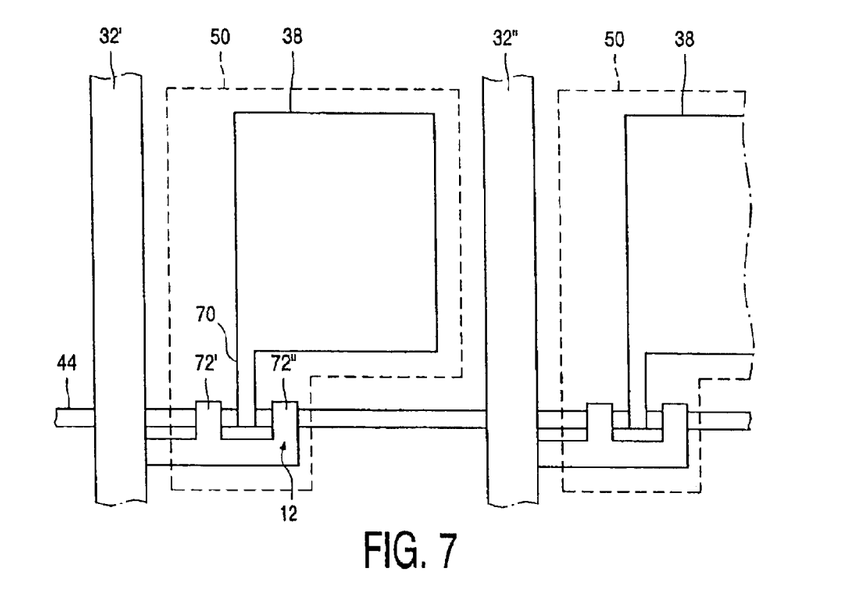
FIG. 7 shows part of the active plate in a further embodiment according to the invention using an alternative type of TFT and using a modified process.

In this device, the set of row conductors 40 are defined on the substrate by appropriate patterning of a deposited metal as before. The set of conductors is then covered by successive layers of deposited silicon nitride, serving as the gate dielectric, and amorphous silicon material. Back exposure using the row conductors 40 as a mask is then utilised to photolithographically pattern these layers, with unwanted portions being removed by etching, so as to leave only portions of these layers directly overlying the row conductors. In the resulting TFTs, therefore, the gates comprise portions of the row conductors with the gate dielectric and amorphous silicon channel defining region directly overlying these portions.

As shown in FIG. 7, the pixel electrode 38 includes an extension 70 that extends over the amorphous silicon at this region to provide a drain contact and the source contact is provided by two fingers 72' and 72" of an extension of the column conductor 32 also extending over the amorphous silicon and to either side of the drain contact.

With this type of structure, where amorphous silicon material is present over the row conductors, there is a risk that parasitic TFTs could be formed between the fingers 72' and 72" and the respective column condutors 32' and 32" to either side of the TFT. To avoid this, the shielding layer 50, here shown in dotted outline, is patterned so that it again covers the pixel electrode 38 and the structure of the TFT 12 but not the entirety of the row conductors, and particularly the regions of the row conductors 44 extending from the TFT to the adjacent pair of column conductors 32' and 32". Following the provision of this shielding layer 50, an etching operation is performed to remove the exposed amorphous silicon material overlying these row conductor regions prior to the non-shielded areas being plated as previously described.

Figure 8:
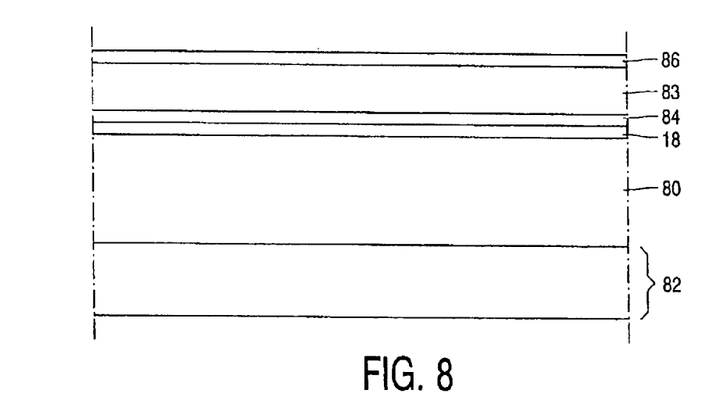
FIG. 8 shows the structure of a complete liquid crystal display.

FIG. 8 shows the structure of a complete liquid crystal display. A layer of liquid crystal material 80 is provided over the active plate 82, which comprises the structure described above. A further substrate 83 overlies the layer of liquid crystal material. This further substrate 83 may be provided on one face with an arrangement of colour filters 84 and a plate defining the common electrode 18 (shown in FIG. 1). A polarizing plate 86 is also provided on the opposite side of the substrate 82.

As this invention is concerned specifically with the transistor substrate, the operation and construction of the liquid crystal display will not be described in any further detail as this will be apparent to those skilled in the art.

In the example described, a storage capacitor is defined using an adjacent row conductor. Instead, a separate storage capacitor line may be provided.

The specific examples described provide Cu plating on ITO transparent electrodes. Other conductive oxide transparent electrodes may be used, and other metals may be plated. These possibilities fall within the scope of the invention.

Additional layers to those described may be provided, and there are various alternatives which will be apparent to those skilled in the art. The specific processing parameters and materials have not been described in detail in this application, as this invention relies upon known individual processing steps and materials. The steps, and the range of possible alternatives, will be apparent to those skilled in the art.

The invention has been described in detail when applied to an active matrix LCD. The invention can also be applied to active matrix LED displays and to image sensors. The invention may be applied to any pixellated device requiring transparent pixel electrodes, where there may be benefit in defining the pixel electrodes using the same layer as for row or column lines of the device. The invention can also be applied to transmissive and reflective active matrix LCD displays. In the case of reflective displays, it may still be desirable to use a transparent layer as ITO has well known benefits for forming the source and drain contacts.

In the examples described above, a transmissive display is shown, and the pixel electrode is transparent and therefore shielded from the plating operation. For a reflective display, the pixel electrode may be plated together with the column conductors, so that only the source and drain areas are shielded.

The specific examples above also describe the use of amorphous silicon TFT. Of course, the invention can equally be applied to pixellated devices in which the pixels each polycrystalline or microcrystalline silicon transistor.

What is claimed is:

1. A method of forming a pixellated device, comprising:
   defining pixel areas, each pixel area comprising:
      a thin film transistor having a gate conductor and source and drain conductors separated by a gate insulator and a semiconductor channel;
      a pixel electrode; and
      a line conductor associated with the source or drain conductor,
   wherein the source and drain conductors, pixel electrodes and line conductors are formed by depositing and patterning a transparent conductor layer and by selectively electroplating areas of the transparent conductor layer to form a metallic layer for reducing the resistivity of the transparent conductor layer, the areas including the line conductors and excluding the source and drain conductors.

2. A method as claimed in claim 1, wherein the areas also exclude the pixel electrodes.

3. A method as claimed in claim 1, wherein the electroplated areas comprise edge regions of the line conductors.

4. A method of forming a pixellated device, comprising:
   defining pixel areas, each pixel area comprising:
      a thin film transistor having a gate conductor and source and drain conductors separated by a gate insulator and a semiconductor channel;
      a pixel electrode; and
      a line conductor associated with the source or drain conductor,
   wherein the source and drain conductors, pixel electrodes and line conductors are formed by depositing and patterning a transparent conductor layer and by selectively plating upper surface areas of the transparent conductor layer using an electroless plating step to form a metallic layer for reducing the resistivity of the transparent conductor layer, the areas including the line conductors and excluding the source and drain conductors.

5. A method as claimed in claim 4, wherein the areas also exclude the pixel electrodes (38).

6. The method as claimed in any preceding claim, comprising
   depositing and patterning a gate conductor layer over an insulating substrate;
   depositing a gate insulator layer over the patterned gate conductor layer;
   depositing a silicon layer over the gate insulator layer; and
   depositing and patterning the transparent conductor layer.

7. A method as claimed in claim 1, wherein the selectivity of the plating is achieved using a printed shielding layer.

8. A method as claimed in claim 7, wherein the selective plating comprises:
   printing a shielding layer for shielding the source and drain conductors; and
   plating the non-shielded areas of the transparent conductor layer to form a metallic layer for reducing the resistivity of the non-shielded areas.

9. A method as claimed in claim 7, wherein the selective plating comprises:
   plating the transparent conductor layer to form a metallic layer for reducing the resistivity;
   printing a shielding layer and removing the metallic layer of the unshielded area.

10. A method as claimed in claim 1, wherein the metallic layer comprises copper or silver.

11. A method as claimed in claim 1, wherein the transparent conductor layer is pretreated before plating.

12. A method as claimed in claim 1, wherein the transparent conductor layer comprises a conductive oxide.

13. A method as claimed in claim 12, wherein the oxide comprises ITO.

14. A method as claimed in claim 13, wherein the ITO is deposited by printing.

15. A method as claimed in claim 1, wherein the gate conductor is deposited and patterned with a first lithographic process and the transparent conductor layer defining source and drain conductors and pixel electrodes is deposited and patterned with a second lithographic process, the silicon layer being self aligned to the gate conductor.

16. A method as claimed in claim 1 for forming the active plate of an active matrix liquid crystal display.

17. A pixellated device, comprising:
   pixel areas, each pixel area comprising:
      a thin film transistor having a gate conductor and source and drain conductors separated by a gate insulator and a semiconductor channel;
      a pixel electrode; and
      a column conductor associated with the source or drain conductor,
   wherein the source and drain conductors, the column conductors and the pixel electrodes are defined by a transparent conductor layer having a metallic layer in contact with a portion of the transparent conductor layer, the portion including the column conductors and excluding the source and drain conductors.

18. A device as claimed in claim 17, wherein the portions also exclude the pixel electrodes.

19. A device as claimed in claim 17, comprising:
   a gate conductor layer over an insulating substrate defining the gate conductors and also defining row conductors;
   the gate insulator layer over the gate conductor layer; and
   the silicon layer over the gate insulator layer and defining the semiconductor channel overlying the gate conductors.

20. A device as claimed in claim 17 wherein the metallic layer is on top of the portion of the transparent conductor.

21. A device as claimed in claim 17, wherein a photoresist layer is on top of the portion of the transparent conductor.

22. A device as claimed in claim 17 comprising the active plate of an active matrix liquid crystal display.

23. An active matrix liquid crystal display comprising an active plate as claimed in claim 22, a passive plate, and a layer of liquid crystal material sandwiched between the active and passive plates.

* * * * *